(12) United States Patent
Spillner (10) Patent No.: US 11,707,909 B2
(45) Date of Patent: Jul. 25, 2023

(54) SURFACE TEMPERATURE-CONTROLLING DEVICE

(71) Applicant: GENTHERM GMBH, Odelzhausen (DE)

(72) Inventor: Rüdiger Spillner, Augsburg (DE)

(73) Assignee: GENTHERM GMBH, Odelzhausen (DE)

( * ) Notice: Subject to any disclaimer, the term of this patent is extended or adjusted under 35 U.S.C. 154(b) by 90 days.

(21) Appl. No.: 16/758,447

(22) PCT Filed: Oct. 23, 2018

(86) PCT No.: PCT/DE2018/000308
§ 371 (c)(1),
(2) Date: May 7, 2020

(87) PCT Pub. No.: WO2019/080957
PCT Pub. Date: May 2, 2019

(65) Prior Publication Data
US 2021/0162899 A1 Jun. 3, 2021

(30) Foreign Application Priority Data
Oct. 27, 2017 (DE) .......................... 102017010012.8

(51) Int. Cl.
*B32B 3/24* (2006.01)
*B32B 3/26* (2006.01)
(Continued)

(52) U.S. Cl.
CPC ................ *B32B 3/266* (2013.01); *B32B 3/26* (2013.01); *B32B 5/02* (2013.01); *B32B 27/12* (2013.01);
(Continued)

(58) Field of Classification Search
None
See application file for complete search history.

(56) References Cited

U.S. PATENT DOCUMENTS 3,370,520 A * 2/1968 Mauch ..................... A47C 7/74
D23/370
3,529,310 A * 9/1970 Olmo ................... A47C 21/044
297/180.13
(Continued)

FOREIGN PATENT DOCUMENTS

CN 202966036 U * 6/2013 ........... B60N 2/5642
DE 10023548 A1 * 11/2001 ........... B60N 2/5635
(Continued)

OTHER PUBLICATIONS

Machine Translation of DE-10316732-A1, Oct. 2004 (Year: 2004).*
(Continued)

*Primary Examiner* — Jeffrey A Vonch
(74) *Attorney, Agent, or Firm* — The Dobrusin Law Firm, P.C.

(57) ABSTRACT

The invention relates to a surface temperature-controlling device, in particular for use in vehicles, comprising a first air-distributing layer which has multiple air inlets extending through the first air-distributing layer and multiple air outlets extending through the first air-distributing layer, and a second air-distributing layer which fluidically connects air inlets and air outlets of the first air-distributing layer, wherein the air inlets are designed to introduce pre-heated or pre-cooled air into the second air-distributing layer, and the air outlets are designed to discharge air out of the second air-distributing layer.

20 Claims, 6 Drawing Sheets

(51) Int. Cl.
    *B32B 5/02*              (2006.01)
    *B60N 2/56*            (2006.01)
    *B60N 2/75*            (2018.01)
    *B60H 1/34*            (2006.01)
    *B32B 27/12*          (2006.01)
    *B60J 5/04*              (2006.01)
    *B60H 1/22*             (2006.01)
    *B60H 3/02*             (2006.01)
    *B60H 1/00*             (2006.01)
    *H05B 3/34*             (2006.01)
    *A47C 7/74*             (2006.01)
    *A47C 7/54*             (2006.01)

(52) U.S. Cl.
    CPC ........... *B60H 1/3407* (2013.01); *B60N 2/565* (2013.01); *B60N 2/5621* (2013.01); *B60N 2/5642* (2013.01); *B60N 2/5657* (2013.01); *B60N 2/5678* (2013.01); *B60N 2/75* (2018.02); *B60N 2/79* (2018.02); *B60N 2/797* (2018.02); *A47C 7/54* (2013.01); *A47C 7/748* (2013.01); *B32B 5/022* (2013.01); *B32B 5/026* (2013.01); *B32B 2305/026* (2013.01); *B32B 2307/724* (2013.01); *B32B 2605/00* (2013.01); *B32B 2605/08* (2013.01); *B60H 1/0055* (2013.01); *B60H 1/00478* (2013.01); *B60H 1/00642* (2013.01); *B60H 1/2225* (2013.01); *B60H 3/024* (2013.01); *B60H 2001/00185* (2013.01); *B60H 2001/00607* (2013.01); *B60H 2001/3485* (2013.01); *B60J 5/0413* (2013.01); *B60J 5/0416* (2013.01); *H05B 3/34* (2013.01); *Y10T 428/24322* (2015.01); *Y10T 428/24331* (2015.01); *Y10T 428/24744* (2015.01)

(56) References Cited

U.S. PATENT DOCUMENTS

| | | | | |
|---|---|---|---|---|
| 3,550,523 A * | 12/1970 | Segal | ................. | B60N 2/56 237/12.3 A |
| 3,681,797 A * | 8/1972 | Messner | ............. | A47C 27/144 5/652.2 |
| 3,711,155 A * | 1/1973 | Bandel | ................ | B60N 2/5875 297/452.55 |
| 4,946,220 A * | 8/1990 | Wyon | ................... | A47C 7/74 297/DIG. 3 |
| 5,117,638 A * | 6/1992 | Feher | ................... | F28F 1/105 62/3.2 |
| 5,243,706 A * | 9/1993 | Frim | ................... | A41D 13/0025 2/81 |
| 5,403,065 A * | 4/1995 | Callerio | ................ | B64G 6/00 297/180.14 |
| 5,524,439 A * | 6/1996 | Gallup | ............... | B60H 1/00478 62/3.61 |
| 5,597,200 A * | 1/1997 | Gregory | ............. | B60N 2/5628 297/452.47 |
| 5,626,021 A * | 5/1997 | Karunasiri | ......... | B60H 1/00285 62/3.61 |
| 5,645,314 A * | 7/1997 | Liou | .................. | A47C 7/74 297/452.45 |
| 5,692,952 A * | 12/1997 | Chih-Hung | ........ | B60H 1/00285 297/180.13 |
| 5,800,480 A * | 9/1998 | Augustine | ............. | A61F 7/10 607/104 |
| 5,921,314 A * | 7/1999 | Schuller | ............... | B60N 2/5628 165/43 |
| 5,921,858 A * | 7/1999 | Kawai | ................ | B60N 2/5642 297/180.14 |
| 5,934,748 A * | 8/1999 | Faust | .................. | B60N 2/5635 297/180.12 |
| 6,004,203 A * | 12/1999 | Bieri | ..................... | B60H 1/247 454/152 |
| 6,019,420 A * | 2/2000 | Faust | .................... | B60N 2/4263 297/180.12 |
| 6,109,688 A * | 8/2000 | Wurz | ..................... | A47C 7/744 297/452.47 |
| 6,189,966 B1 * | 2/2001 | Faust | .................... | B60N 2/5635 297/180.13 |
| 6,196,627 B1 * | 3/2001 | Faust | .................... | B60N 2/5635 297/180.1 |
| 6,224,150 B1 * | 5/2001 | Eksin | ................... | B60N 2/5635 297/180.12 |
| 6,277,023 B1 * | 8/2001 | Schwarz | ............. | B60N 2/5635 297/452.47 |
| 6,629,725 B1 * | 10/2003 | Kunkel | ................ | B60N 2/5635 297/452.47 |
| 2001/0035669 A1 * | 11/2001 | Andersson | ............... | B60N 2/56 297/180.11 |
| 2002/0003362 A1 * | 1/2002 | Kunkel | ................ | B60N 2/5825 297/180.14 |
| 2002/0003363 A1 * | 1/2002 | Buss | .................... | B60N 2/5657 297/180.14 |
| 2002/0011071 A1 * | 1/2002 | Needham | ............. | B60N 2/5635 297/180.13 |
| 2002/0174972 A1 * | 11/2002 | Ichigaya | ................ | A43B 7/081 165/46 |
| 2003/0186642 A1 * | 10/2003 | Aoki | .................... | B60N 2/5635 454/120 |
| 2003/0211278 A1 * | 11/2003 | Schaefer | .................... | B32B 5/18 428/71 |
| 2003/0230913 A1 * | 12/2003 | Buss | .................... | B60N 2/5642 297/180.14 |
| 2004/0090093 A1 * | 5/2004 | Kamiya | ............... | B60N 2/5628 297/180.14 |
| 2004/0139758 A1 * | 7/2004 | Kamiya | ............... | B60N 2/5635 454/120 |
| 2004/0160093 A1 * | 8/2004 | Stoewe | ................ | B60N 2/5657 297/180.1 |
| 2004/0164594 A1 * | 8/2004 | Stoewe | ................ | B60N 2/5635 297/180.14 |
| 2004/0189061 A1 * | 9/2004 | Hartwich | ............. | B60N 2/5635 297/180.14 |
| 2005/0070219 A1 * | 3/2005 | Wollenhaupt | ........ | B60N 2/5685 454/120 |
| 2005/0082885 A1 * | 4/2005 | Thunissen | ........... | B60N 2/5635 297/180.1 |
| 2005/0188849 A1 * | 9/2005 | Yoneno | ................ | B60N 2/5657 96/143 |
| 2006/0060344 A1 * | 3/2006 | Esaki | ................... | B60N 2/5825 165/287 |
| 2006/0138811 A1 * | 6/2006 | Pfahler | ................ | B60N 2/5635 297/180.14 |
| 2006/0249995 A1 * | 11/2006 | Stoewe | .................... | A47C 7/74 297/180.14 |
| 2006/0290175 A1 * | 12/2006 | Hartwich | ............. | B60N 2/5635 297/180.13 |
| 2007/0035162 A1 * | 2/2007 | Bier | ..................... | B60N 2/5635 165/138 |
| 2007/0101729 A1 * | 5/2007 | Aoki | .................... | B60N 2/5657 62/3.61 |
| 2007/0120401 A1 * | 5/2007 | Minuth | ................ | B60N 2/5621 297/180.14 |
| 2007/0145808 A1 * | 6/2007 | Minuth | ................ | B60N 2/5621 297/452.42 |
| 2007/0241604 A1 * | 10/2007 | Saitou | ...................... | B60N 2/70 297/452.26 |
| 2007/0246975 A1 * | 10/2007 | Bier | ..................... | B60N 2/5621 297/180.1 |
| 2008/0012398 A1 * | 1/2008 | Alacqua | ............... | B60N 2/5628 297/180.1 |
| 2008/0100101 A1 * | 5/2008 | Wolas | ................... | A47C 7/744 297/180.15 |
| 2009/0079236 A1 | 3/2009 | Itou et al. | | |
| 2009/0102250 A1 * | 4/2009 | Wolfe, IV | ............ | B60N 2/5614 297/180.15 |

(56) References Cited

U.S. PATENT DOCUMENTS

| | | | | |
|---|---|---|---|---|
| 2009/0127894 A1* | 5/2009 | Bargheer | ............ | B60N 2/5635 297/452.42 |
| 2009/0134675 A1* | 5/2009 | Pfahler | ................ | B60N 2/5635 454/120 |
| 2009/0322124 A1* | 12/2009 | Barkow | ................... | A47C 7/74 297/180.14 |
| 2010/0071130 A1* | 3/2010 | Frias | .................... | A47C 27/082 5/710 |
| 2010/0295339 A1* | 11/2010 | Siu | ....................... | B60N 2/5635 297/180.14 |
| 2010/0327636 A1* | 12/2010 | Stoll | ..................... | B60N 2/565 296/146.7 |
| 2011/0109128 A1* | 5/2011 | Axakov | ................. | A47C 7/744 137/561 A |
| 2011/0175416 A1* | 7/2011 | Cohen | ..................... | B60N 2/70 297/354.12 |
| 2011/0227389 A1* | 9/2011 | Gomes | ................. | B60N 2/5635 297/452.43 |
| 2011/0260509 A1* | 10/2011 | Siu | ........................ | B60N 2/565 297/180.14 |
| 2012/0080911 A1* | 4/2012 | Brykalski | ............ | B60N 2/565 297/180.15 |
| 2012/0261974 A1* | 10/2012 | Yoshizawa | .......... | B60N 2/5657 297/452.42 |
| 2013/0264742 A1* | 10/2013 | Ota | ...................... | B60N 2/5657 264/266 |
| 2014/0159442 A1* | 6/2014 | Helmenstein | ........ | B60N 2/5671 454/120 |
| 2015/0314716 A1* | 11/2015 | Zimmann | ............ | B60N 2/7017 297/452.42 |
| 2016/0304013 A1* | 10/2016 | Wolas | .................. | B60N 2/5657 |
| 2016/0325655 A1* | 11/2016 | Joshi | .................... | B60N 2/5657 |
| 2017/0028886 A1* | 2/2017 | Zhang | .................. | B60N 2/5642 |
| 2017/0164757 A1* | 6/2017 | Thomas | ................... | A47C 7/74 |
| 2017/0196362 A1* | 7/2017 | Miron | ................... | B60N 2/5635 |
| 2017/0325287 A1* | 11/2017 | Ji | .......................... | H05B 1/0236 |
| 2018/0022252 A1* | 1/2018 | Arata | ....................... | B60N 2/56 297/452.42 |
| 2018/0054858 A1* | 2/2018 | Dry | ......................... | B32B 27/08 |
| 2018/0065524 A1* | 3/2018 | Bauer | .................. | B60N 2/5657 |
| 2018/0162243 A1* | 6/2018 | Akaike | ................ | A47C 7/5062 |
| 2018/0178692 A1* | 6/2018 | Zhao | .................... | B60N 2/5657 |
| 2018/0201165 A1* | 7/2018 | Rekow | .............. | B60H 1/00285 |
| 2019/0232835 A1* | 8/2019 | Murakami | ............... | B60N 2/56 |
| 2019/0283527 A1* | 9/2019 | Kawashima | ....... | B60H 1/00285 |
| 2019/0291534 A1* | 9/2019 | Arata | ................. | B60H 1/00285 |
| 2020/0070696 A1* | 3/2020 | Friderich | ................. | B60N 2/70 |
| 2020/0376930 A1* | 12/2020 | Neumeister | .......... | B60H 1/2227 |

FOREIGN PATENT DOCUMENTS

| | | | | |
|---|---|---|---|---|
| DE | 10134383 C1 * | 7/2002 | ........... | B60N 2/5635 |
| DE | 10144839 A1 * | 3/2003 | ........... | B60N 2/5635 |
| DE | 10349410 A1 * | 5/2004 | ......... | B60H 1/00271 |
| DE | 10316732 A1 * | 10/2004 | ........... | B60N 2/5628 |
| DE | 102005004971 A1 * | 9/2006 | ........... | A47C 21/044 |
| DE | 102006005343 A1 * | 8/2007 | ........... | B60N 2/5642 |
| DE | 102009013257 A1 * | 10/2009 | ........... | B60N 2/5635 |
| DE | 102009013258 A1 * | 10/2009 | ............ | B60N 2/565 |
| DE | 102009024781 A1 * | 12/2010 | ........... | B60N 2/5657 |
| DE | 102011011504 A1 * | 8/2012 | ............ | B60N 2/565 |
| DE | 102012006074 A1 * | 11/2012 | ............ | B60N 2/565 |
| DE | 10 2013 020 799 A1 | 7/2014 | | |
| DE | 102014004415 A1 * | 9/2014 | ........... | B60N 2/5635 |
| DE | 102014206613 A1 * | 10/2015 | ............... | B60N 2/56 |
| DE | 10 2015 010 661 A1 | 3/2016 | | |
| DE | 102015010701 A1 * | 3/2016 | ........... | B60N 2/5642 |
| EP | 1806258 A1 * | 7/2007 | ........... | B60N 2/5635 |
| FR | 2841839 A1 * | 1/2004 | ............ | B29C 44/14 |
| FR | 2882307 A1 * | 8/2006 | ........... | B60N 2/5635 |
| FR | 2887193 A1 * | 12/2006 | ........... | B29C 44/141 |
| JP | 2003004688 A * | 1/2003 | ............... | B60N 2/56 |
| JP | 2004008334 A * | 1/2004 | ........... | B60N 2/5657 |
| JP | 2007007378 A * | 1/2007 | ........... | A47C 21/044 |
| JP | 2010000253 A * | 1/2010 | | |
| JP | 2010052494 A * | 3/2010 | ........... | B60N 2/5642 |
| JP | 2016147615 A * | 8/2016 | | |
| KR | 2002023839 A * | 3/2002 | ........... | B60N 2/5635 |
| KR | 2004048567 A * | 6/2004 | | |
| WO | WO-0105623 A1 * | 1/2001 | ........... | B60N 2/5635 |
| WO | WO-2005084493 A1 * | 9/2005 | ............... | A47C 7/74 |
| WO | WO-2006117690 A2 * | 11/2006 | ........... | B60N 2/5635 |
| WO | WO-2006131189 A1 * | 12/2006 | ........... | B60N 2/5635 |
| WO | WO-2009003579 A1 * | 1/2009 | ......... | B60H 1/00285 |
| WO | WO-2014072037 A1 * | 5/2014 | ........... | B60N 2/5635 |

OTHER PUBLICATIONS

Machine Translation of FR-2882307-A1, Aug. 2006 (Year: 2006).*
Machine Translation of DE-102006005343-A1, Aug. 2007 (Year: 2007).*
Machine Translation of DE-102013020799-A1, Jul. 2014 (Year: 2014).*
Machine Translation of DE-10134383-C1, Jul. 2002 (Year: 2002).*
Machine Translation of KR-2002023839-A, Mar. 2002 (Year: 2002).*
Machine Translation of DE-102012006074-A1, Nov. 2012 (Year: 2012).*
Machine Translation of CN-202966036-U, Jun. 2013 (Year: 2013).*
Machine Translation of WO-2014072037-A1, May 2014 (Year: 2014).*
Machine Translation of DE-10349410-A1, May 2004 (Year: 2004).*
International Search Report and Written Opinion for International Application PCT/DE2018/000308, dated Feb. 22, 2019.

* cited by examiner

SURFACE TEMPERATURE-CONTROLLING DEVICE

The invention relates to a surface temperature-controlling device, in particular for use in vehicles, comprising a first air-distributing layer which has multiple air inlets extending through the first air-distributing layer and multiple air outlets extending through the first air-distributing layer, and a second air-distributing layer which fluidically connects air inlets and air outlets of the first air-distributing layer.

The invention also relates to a resting area, in particular for use in the interior of a vehicle, with a temperature-adjustable resting surface and a surface temperature-controlling device configured to adjust the temperature of the resting surface.

Increasing expectations with regard to the interior comfort of vehicles have led to more and more temperature-controlled surfaces being installed in the area of the vehicle seats. Temperature-controlling devices are used for controlling the temperature of surfaces which are in contact with the driver or other occupants of the vehicle during the use of the vehicle. Temperature-controlled surfaces thus significantly increase the climate comfort within a vehicle.

However, it has been shown that the solutions known so far are only of limited suitability for practical use or result in certain comfort impairments. Surface temperature-controlling devices are known, for example, in which preheated air is introduced into a temperature-controlled area through a single inlet and is discharged out of the temperature-controlled area through a single outlet. The resulting unidirectional flow direction of the preheated air results in practice in an uneven temperature distribution within the temperature range, which the user perceives as having a negative impact on comfort.

In addition, surface temperature-controlling devices are known in which temperature control lines or tubes, for example made of plastic or metal, are used below the surface to be temperature-controlled in order to implement a surface temperature control. The respective solutions regularly lead to comparatively high costs and a high weight.

In addition, heat-conducting inserts and heat distribution devices are known, which are arranged below the surface to be temperature-controlled and are connected to a temperature-controlling device. However, the area of application of the corresponding solutions is extremely limited, so they cannot be used in a large number of areas of application.

The object on which the invention is based is to at least partially overcome the disadvantages of the surface temperature-controlling devices known from prior art. In particular the temperature distribution is to be improved and the temperature control time is to be shortened.

The object on which the invention is based is achieved by a surface temperature-controlling device of the type mentioned at the outset in which the air inlets of the surface temperature-controlling device according to the invention are configured to introduce preheated air into the second air-distributing layer and in which the air outlets are configured to discharge air from the second air-distributing layer.

The invention makes use of the knowledge that the fluidic connection of multiple air inlets and multiple air outlets produces a multidirectional flow of the preheated air within the second air-distributing layer, which results in an extremely uniform temperature distribution. As a result of the considerably shortened flow paths for the preheated air, the time it takes to reach the set target temperature is shortened as well. Furthermore, the surface temperature-controlling device according to the invention allows the use of comparatively thin material layers as the top material layer. Due to the distribution of the air flow to multiple air inlets and multiple air outlets, a back pressure is generated that is lower compared to the known solutions, so the design is simplified and the susceptibility to damage is reduced.

The second air-distributing layer can fluidically connect individual, several or all air inlets to individual, several or all air outlets. The air inlets and air outlets are preferably arranged adjacent to each other and/or extend in the same direction. The surface temperature-controlling device can be designed as a cooling device or a heating device or a combined cooling/heating device. The surface temperature-controlling device thus allows for comprehensive air conditioning.

In a preferred embodiment of the surface temperature-controlling device according to the invention, the second air-distributing layer is designed in such a way that air flows that run transversely to the air inlets and/or air outlets are created inside the second air-distributing layer. The flow directions resulting in the second air-distributing layer are preferably arranged in a flow plane that is orthogonal to the flow direction within the air inlets and/or air outlets.

In a further embodiment of the surface temperature-controlling device according to the invention, the first air-distributing layer has a surface which faces the second air-distributing layer and which comprises a plurality of air inlet openings and air outlet openings. The air inlet openings are part of the air inlets. The air outlet openings are part of the air outlets. The surface of the first air-distributing layer facing the second air-distributing layer preferably runs parallel to the flow plane in which the flow directions of the preheated air lie within the second air-distributing layer.

In addition, a surface temperature-controlling device according to the invention is preferred in which the cross section of several or all of the air inlets and/or air outlets and/or several or all of the air inlet openings and/or air outlet openings have different sizes, in particular different diameters. The different sizes make it possible to influence the flow intensity and the flow direction within the second air-distributing layer. Furthermore, this allows the implementation of specific flow patterns or the generation of local flow areas that have an increased or a reduced air throughput. Alternatively, the cross section of several or all of the air inlets and/or air outlets and/or several or all of the air inlet openings and/or air outlet openings can have the same size, in particular the same diameter. A uniform flow pattern can thus be achieved by a corresponding arrangement of the air inlets and air outlets.

A surface temperature-controlling device according to the invention in which the cross section of several or all of the air inlets and/or air outlets and/or several or all of the air inlet openings and/or air outlet openings have different shapes is advantageous as well. The cross sections of the air inlets and/or the air outlets and/or the air inlet openings and/or the air outlet openings may be round or oval or oblong, triangular, square, pentagonal or polygonal. Alternatively, the cross section of several or all of the air inlets and/or air outlets and/or several or all of the air inlet openings and/or air outlet openings may also have the same shape.

In another embodiment of the surface temperature-controlling device according to the invention, the number of air inlets differs from the number of air outlets. The number of air inlets is greater than the number of air outlets, for example. Alternatively, the number of air outlets is greater than the number of air inlets. The flow pattern within the second air-distributing layer can also be influenced by the number and arrangement of the air inlets and air outlets. Alternatively, the number of air inlets and the number of air outlets can also be the same.

In a further development of the surface temperature-controlling device according to the invention, the air inlets, the air outlets, the air inlet openings and/or the air outlet openings are arranged evenly or unevenly. Preferably, several or all of the air inlets and/or air inlet openings are arranged in one or more rows. The rows of air inlets and/or air inlet openings preferably run parallel to one another. The air outlets and/or the air outlet openings are preferably arranged in one or more rows. The rows of air outlets and/or air outlet openings preferably run parallel to one another. An embodiment is particularly preferred in which the one or more rows of air inlets and/or air inlet openings run parallel to the one or more rows of air outlets and/or the air outlet openings.

In another preferred embodiment of the surface temperature-controlling device according to the invention, the first air-distributing layer and/or the second air-distributing layer comprise flow constrictions which are configured to influence the air flow and to cause a change in pressure. The flow restrictions create flow resistances that change the air flow. This results in a change in the flow rate and/or the pressure.

In another embodiment of the surface temperature-controlling device according to the invention, a group of air outlets is assigned to several or all of the air inlets, the air outlets of a group being evenly spaced apart and/or evenly distributed around the air inlet to which the group of air outlets is assigned. The individual groups of air outlets preferably have the same number of air outlets that are assigned to an air inlet.

In addition, a surface temperature-controlling device according to the invention in which a group of air inlets is assigned to several or all of the air outlets, wherein the air inlets of a group are evenly spaced apart and/or evenly distributed around the air outlet to which the group of air inlets is assigned is advantageous. The individual groups of air inlets preferably have the same number of air inlets that are assigned to an air outlet.

Air inlets and/or air outlets arranged in series preferably have the same shape and/or size, but the air inlets and/or air outlets of different rows can differ in size and/or shape. individual rows preferably have a larger number of air outlet openings or air inlet openings than other rows. Alternatively, air inlets and/or air outlets arranged in series have different shapes and/or sizes.

In addition, a surface temperature-controlling device according to the invention in which several or all of the external adjacent air inlets, air outlets, air inlet openings and/or air outlet openings have a smaller distance from one another and/or a different size, in particular a different diameter, than the internal air inlets, air outlets, air inlet openings and/or air outlet openings is preferred. The smaller distance from each other increases the number of outer air inlets, air outlets, air inlet openings and/or air outlet openings. The outer air inlets, air outlets, air inlet openings and/or air outlet openings can be larger or smaller than the inner air inlets, air outlets, air inlet openings and/or air outlet openings.

In another embodiment of the surface temperature-controlling device according to the invention, several or all of the air inlets within the first air-distributing layer and/or on the side of the first air-distributing layer facing away from the second air-distributing layer are fluidically connected to one another. Alternatively or additionally, several or all of the air outlets within the first air-distributing layer and/or on the side of the first air-distributing layer facing away from the second air-distributing layer can be fluidically connected to one another. The air inlets can be connected to one another via bypass lines within the first air-distributing layer. The air outlets within the first air-distributing layer can be connected to one another via bypass lines. One or more air inlet ports and/or one or more air outlet ports can be arranged on the side of the first air-distributing layer facing away from the second air-distributing layer. Several or all of the air inlets can be connected to the air inlet ports. Several or all of the air outlets can be connected to the air outlet ports. The provision of bypass lines or corresponding air inlet and/or air outlet ports leads to a redistribution of the air flow when individual air inlets or air outlets are closed, for example due to a deformation. This way, a uniform temperature control of the surface can also be ensured if no air flow forms within individual air inlets and/or air outlets.

In particular, groups of air inlets are fluidically connected to an air inlet port. The air inlets of a group of air inlets thus supply air to the second air-distributing layer in parallel from the air inlet port assigned to the respective group of air inlets. In particular, groups of air outlets are fluidically connected to an air outlet port. The air outlets of a group of air outlets thus discharge air in parallel from the second air-distributing layer in the direction of the air outlet port assigned to the respective group of air outlets. The parallel air supply to the second air-distributing layer via several air inlets and the parallel air removal from the second air-distributing layer via several air outlets allow the supply of the second air-distributing layer with heated or cooled air to be maintained even if individual air inlets and/or air outlets are temporarily or permanently closed, for example due to a deformation. Such deformation can occur, for example, due to mechanical stress or contamination.

In a further development of the surface temperature-controlling device according to the invention, air-permeable material is arranged in or in front of the air inlet openings and/or the air outlet openings. The air-permeable material prevents the formation of depressions on the surface and/or any local sagging of the surface. The material arranged in or in front of the air inlet openings and/or the air outlet openings is preferably non-elastic or can have a fiber structure, for example made of plastic or fiberglass fibers. The material can be glued or welded on. The material arranged in or in front of the air inlet openings and/or the air outlet openings can also be an integral part of an air distribution body of the first air-distributing layer. In addition, the air inlets and/or air outlets can be arranged below stiffening elements. The stiffening elements can be formed by an additional film heating system, in particular a graphite film heating system.

In another embodiment of the surface temperature-controlling device according to the invention, the first air-distributing layer and the second air-distributing layer are integrated in a flow circuit. Air circulates within the flow circuit so that the temperature-controlled air is used repeatedly. A corresponding flow circuit is advantageous, in particular, if the ambient temperature and the target temperature of the surface to be temperature-controlled deviate greatly from one another, i.e., if a larger temperature difference has to be bridged. When using air-controlled air several times, a comparatively fast temperature adjustment of surfaces can be implemented. Furthermore, the use of a flow circuit reduces the energy required for the corresponding temperature control processes.

The surface temperature-controlling device according to the invention is further advantageously developed in that the flow circuit has a condensation removal device which is configured to remove condensation from the air circulating in the flow circuit. The condensation removal device can comprise, for example, nonwoven fabric through which the air flows and reduces the air humidity. A corresponding condensation removal device prevents or at least reduces the freezing or clogging of heat exchange surfaces, heat pump devices or thermoelectric devices, which comprise Peltier elements, for example.

In addition, a surface temperature-controlling device according to the invention in which the first air-distributing layer and/or the second air-distributing layer is formed from an air-permeable material or which have an air-permeable material in some areas is advantageous. The air-permeable material can be spacer fabric. The air-permeable material can be a nonwoven fabric as well. It can also be a porous material. The first air-distributing layer and/or the second air-distributing layer can be formed from a soft, in particular elastically deformable, material or, in some areas, comprise a soft, in particular elastically deformable, material.

A surface temperature-controlling device according to the invention in which the first air-distributing layer is formed by an air distribution body which is formed from a hard shell material, in particular from plastic, is also preferred. The air distribution body forms each of the air inlets and/or air outlets. The air distribution body is preferably formed in one piece. By using an appropriate air distribution body, the number of parts is considerably reduced, and the manufacture of the surface temperature-controlling device is significantly simplified. The reduced number of parts also reduces the susceptibility to damage and increases the service life.

In addition, a surface temperature-controlling device according to the invention in which a separating layer is arranged between the first air-distributing layer and the second air-distributing layer, which preferably has a higher rigidity than the first air-distributing layer and/or the second air-distributing layer is advantageous. In particular, the separating layer comprises air passages which are fluidically connected to the air inlets and/or air outlets of the first air-distributing layer. The separation layer increases the level of stiffness, so that comparatively soft materials can also be used for the first air-distributing layer and/or the second air-distributing layer. The use of a comparatively rigid separation layer also prevents the air supply to the first air-distributing layer from being cut off by local pressure. The rigid separating layer effectively avoids a deformation and thus a closing of the air inlets and air outlets.

In a further embodiment of the surface temperature-controlling device according to the invention, the first air-distributing layer, the second air-distributing layer and/or the separating layer is designed to be light-permeable, transparent, translucent, light-impermeable and/or opaque. If the first air-distributing layer, the second air-distributing layer and/or the separating layer is designed to be light-permeable or transparent, the air inlets and air outlets can be checked visually. In particular, display elements such as LEDs can be arranged in, on or under the first air-distributing layer, the second air-distributing layer and/or the separation layer. By making these layers light-permeable, translucent and/or transparent, the display elements can be seen from the outside, in particular on a resting surface. Furthermore, it can be advantageous to optically hide the first air-distributing layer, the second air-distributing layer, the separating layer and/or other components of the surface temperature-controlling device so that they cannot be seen from the outside. In particular, display elements such as LEDs can be positioned under the first air-distributing layer or in the separation layer, which are visible through the cover of the resting surface over the second air-distributing layer. If the first air-distributing layer, the second air-distributing layer and/or the separating layer is translucent, a dispersion of punctiform light sources can be implemented.

In addition, a surface temperature-controlling device according to the invention in which the first air-distributing layer, the second air-distributing layer and/or the separating layer is designed to be sound-absorbing and/or vibration-absorbing is advantageous. The noise level in the interior of the vehicle can be reduced by an appropriate sound absorption, which further increases the comfort a use of the vehicle. The vibration absorption can reduce vibrations that are caused, for example, by the air currents. Corresponding vibrations are no longer perceived by a user or at least perceived as non-disturbing, so this also increases the convenience of use.

A surface temperature-controlling device according to the invention in which the first air-distributing layer, the second air-distributing layer and/or the separating layer has a defined capacity and/or comprise electronic devices is also advantageous. The electronic devices can be electrical conductors, printed circuit boards and/or electrical detection devices. The electrical detection devices can, for example, be temperature, pressure and/or light detection devices or sensors.

A surface temperature-controlling device according to the invention is also preferred if it has a temperature-controlling surface to be temperature-controlled, which is coupled to the second air-distributing layer in a heat-transferring manner. The surface to be temperature-controlled and the second air-distributing layer are thus in thermal contact. The heat-transferring coupling allows for a heat exchange between the second air-distributing layer and the surface to be temperature-controlled. The air flow preferably forms in the second air-distributing layer directly below control surface to be temperature-controlled. The air flow mainly has directions of flow which lie in a flow plane that runs parallel to the surface to be temperature-controlled. As a result, a uniform surface temperature is achieved on the surface to be temperature-controlled. Alternatively, temperature patterns, such as temperature gradients or local temperature differences, can also be generated on the surface.

In another embodiment of the surface temperature-controlling device according to the invention, the material layer supporting the surface to be temperature-controlled is made of silicone or graphite. The surface of the surface temperature-controlling device can then be covered with leather or fabric in which case the leather or fabric cover then serves as the resting surface.

In addition, a surface temperature-controlling device in which an electric heating device is arranged between the second distribution layer and the material layer to be temperature-controlled is preferred. Alternatively, an electric heating device is integrated into the material layer supporting the surface to be temperature-controlled. The electric heating device can be, for example, a film heating system, in particular a graphite film heating system. The heating power of the surface temperature-controlling device can be further increased by the electric heating device. In addition, the electrical heading device can reduce the required heating times.

The surface temperature-controlling device according to the invention is further developed by a temperature control system which is configured to temperature-control air before it is introduced into the air inlets of the first air-distributing layer. As an alternative or in addition, the surface temperature-controlling device has a flow generator which is configured to initiate the flow of the temperature-controlled air. The temperature control system can comprise one or more thermoelectric devices. The thermoelectric devices can be designed as Peltier elements or comprise Peltier elements. The flow generator can be designed as a fan. The one or more thermoelectric devices preferably have a service side and an exhaust air side. The service side is used to temperature-control the air to be introduced into the first air-distributing layer and the second air-distributing layer. The exhaust air side of the one or more thermoelectric devices can be equipped with an additional temperature control. If the temperature control system comprises a plurality of thermoelectric devices, the temperature-controlling areas of the thermoelectric devices are preferably connected in series so that the air flows sequentially through the temperature-controlling areas of the thermoelectric devices. The exhaust air areas of the thermoelectric devices are preferably connected in parallel. Because the air flows sequentially through the temperature-controlled area of the thermoelectric devices and because the exhaust air areas of the thermoelectric devices are connected in parallel, the temperature level on the exhaust air side of the thermoelectric devices is lower during cooling operation, as a result of which it is possible to cool the service air of the thermoelectric devices to even lower temperatures. In addition, the parallelization of the exhaust air areas of the thermoelectric devices reduces the back pressure compared to an alternative sequential flow through the exhaust air areas of the thermoelectric devices. This allows for a larger air flow and/or quieter operation because the flow generator(s) can then work at a lower speed. The parallelization of the exhaust air areas of the thermoelectric devices also allows the use of only one flow generator instead of two individual flow generators to generate an exhaust air flow. By separating the service air and the exhaust air flow, different flow generators can be used, which can be operated in an optimized manner, for example with regard to the respective back pressure and/or volume flow. Furthermore, both flow generators can be controlled independently, which facilitates a more precise control or regulation of the overall thermal system. As an alternative to the exhaust air flow, a liquid can also flow through the exhaust air side.

In a further embodiment of the surface temperature-controlling device according to the invention, this device comprises a control device which is configured to control the temperature-controlling system and/or the flow generator. The control device makes it possible, for example, to set a target temperature on the surface to be temperature controlled.

The temperature-controlling device and/or the flow generator can be controlled on the basis of the temperature difference between the target temperature and the ambient temperature. The control device also allows a suitable volume flow and/or a suitable flow rate by setting the flow generator.

The problem addressed by the invention is further solved by a rest of the type described above, wherein the surface temperature-controlling device of the vehicle seat according to the invention is designed in accordance with one of the embodiments described above. With regard to the advantages and modifications of the rest according to the invention, reference is made to the advantages and modifications of the surface temperature-controlling device according to the invention. The rest can, in particular, be an armrest of a vehicle.

Below, preferred embodiments of the invention are explained and described in more detail with reference to the attached drawings.

Figure 1:
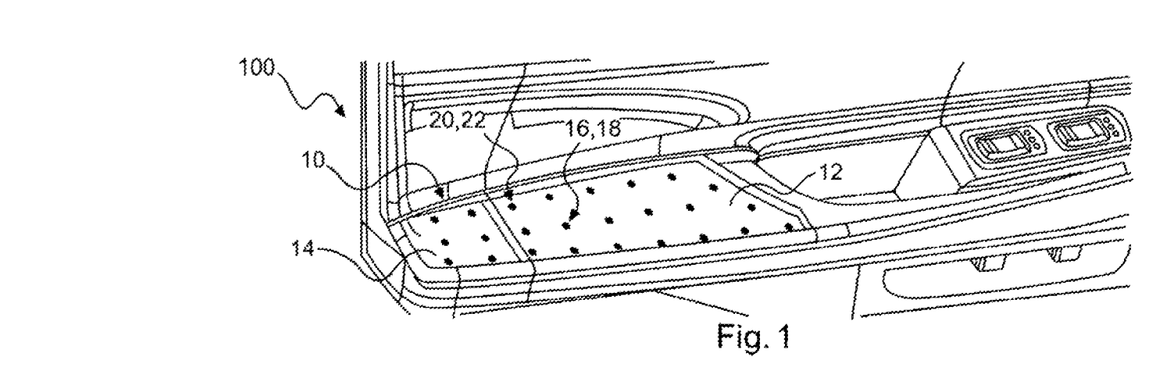
FIG. 1 shows parts of a rest according to the invention in a perspective view.

FIG. 1 shows a rest 100 designed as an armrest, which is installed in the interior of a vehicle. The rest 100 comprises a surface temperature-controlling device 10, which is partially shown. The surface temperature-controlling device 10 is used to temperature-control a surface of the rest, not shown.

The surface temperature-controlling device 10 has a temperature control system 48, wherein the temperature control system 48 pre-heats or pre-cools air and makes the pre-heated or pre-cooled air available to the air-distributing layer 14 shown. The air-distributing layer 14 has multiple air inlets 18 extending through the air-distributing layer 14 and multiple air outlets 22 extending through the air-distributing layer 14. The air-distributing layer 14 has a surface 12 facing the surface of the rest, not shown, which comprises a plurality of air inlet openings 16 and air outlet openings 20. The air inlet openings 16 are components of the respective air inlets 18. The air outlet openings 20 are components of the respective air outlets 22.

A further, not shown, air-distributing layer 34 is arranged above the air-distributing layer 14 and fluidically connects the air inlets 18 and the air outlets 22 of the air-distributing layer 14 to one another. Pre-heated or pre-cooled air can thus be introduced into the air-distributing layer 34 through the air inlets 18 and discharged again from the air-distributing layer 34 through the air outlets 22.

Figure 2:
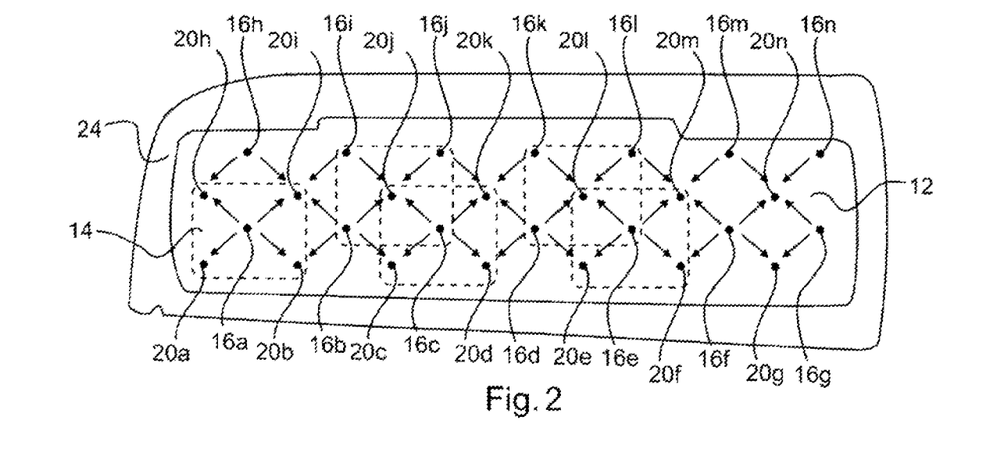
FIG. 2 shows an air distribution body of a surface temperature-controlling device according to the invention in a plan view.

FIG. 2 shows an air distribution body 24, which comprises a first air-distributing layer 14. The air distribution body 24 is formed from a hard shell material, namely from plastic. The air distribution body 24 forms each of the air inlets 18 and/or air outlets 22 as air ports. In the area of the surface 12, the air inlets 18 and the air outlets 22 have corresponding air inlet openings 16a-16n and air outlet openings 20a-20n. The air inlet openings 16a-16n and the air outlet openings 20a-20n are distributed in a substantially uniform manner. A group of air outlet openings 20a-20n is assigned to each of the air inlet openings 16a-16n, the air outlet openings 20a-20n being arranged in a group evenly spaced apart from each other and evenly distributed around the air inlet opening 16a-16n, which is assigned to the group of air outlet openings 20a-20n. The air outlet openings 20a, 20b, 20h, 20i are evenly arranged around the air inlet opening 16a and spaced at an equal distance from the same.

Furthermore, a group of air inlet openings 16a-16n is assigned to each of the air outlet openings 20a-20n, wherein the air inlet openings 16a-16n are arranged in a group that is evenly spaced from and evenly distributed around the air outlet opening 20a-20n, which is assigned to the group of air inlet openings 16a-16n. The air inlet openings 16b, 16c, 16i, 16j, for example, are evenly arranged around the air inlet opening 20j and are at an equal distance from the same.

Figure 3:
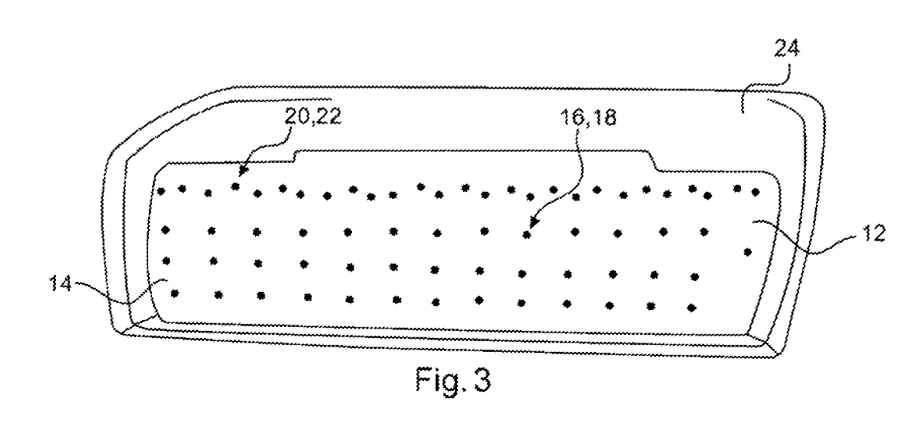
FIG. 3 shows a further air distribution body of a surface temperature-controlling device according to the invention in a plan view.

FIG. 3 also shows an air distribution body 24 which comprises a plurality of air inlets 18 and a plurality of air outlets 22 which have corresponding air inlet openings 16 or air outlet openings 20 in the area of the surface 12.

To adapt the back pressure and the air flow, the air inlets 18 and the air outlets 22 are arranged in four rows that run essentially parallel to one another. The lower three rows each have an identical number of air inlets 18 and/or air outlets 22. The upper row has approximately twice the number of air inlets 18 or air outlets 22. Thus, the in-row distance between the openings in the lower three rows is greater than the in-row distance between the openings in the top row.

In addition, the air inlet openings 16 and air outlet openings 20 have different sizes or more specifically different diameters. The diameter changes along the respective row arrangement with the diameter decreasing in the present case from left to right. This configuration allows the precise setting of an intended surface temperature or heat flow distribution.

Figure 4:
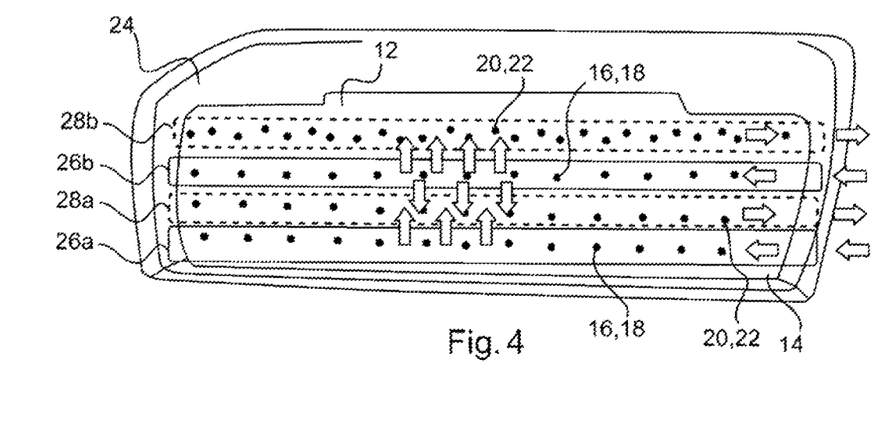
FIG. 4 shows a further air distribution body of a surface temperature-controlling device according to the invention in a plan view.

FIG. 4 shows that the air inlets 18 and air outlets 22 are assigned to the rows 26a, 26b, 28a, 28b, which run essentially parallel to one another. The rows 26a, 26b comprise the air inlets 18. The rows 28a, 28b comprise the air outlets 22. The arrows between the rows 26a, 26b, 28a, 28b show that air flows transversely to the air inlets 18 and the air outlets 22 within the air-distributing layer 34 adjoining the surface 12. The air inlets 18 and the air outlets 22 of the respective rows 26a, 26b, 28a, 28b are fluidically connected to corresponding air inlet ports or air outlet ports on the underside of the air distribution body 24, via which air is made available to the air inlets 18, and air is discharged from the air outlets 22.

Figure 5:
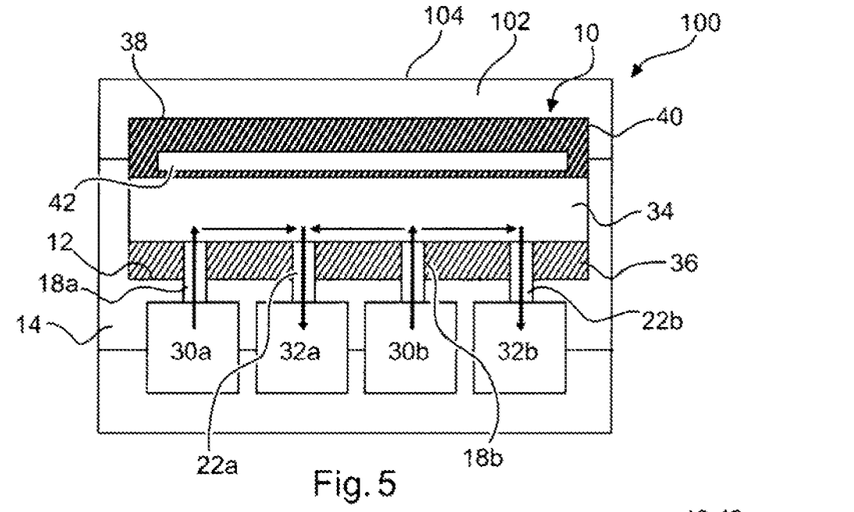
FIG. 5 shows an exemplary embodiment of a surface temperature-controlling device according to the invention in a schematic representation.

FIG. 5 shows a surface temperature-controlling device 10 with a first distribution layer 14, which has multiple air inlets 18a, 18b extending through the air-distributing layer 14 and multiple air outlets 22a, 22b extending through the first air-distributing layer 14. Furthermore, the surface temperature-controlling device 10 comprises a second air-distributing layer 34, which fluidically connects the air inlets 18a, 18b and the air outlets 22a, 22b of the first air-distributing layer 14.

The air inlets 18a, 18b introduce the pre-heated or pre-cooled air into the second air-distributing layer 34, with the air outlets 22a, 22b discharging air from the second air-distributing layer 34.

The pre-heated or pre-cooled air is made available to the air inlets 18a, 18b via the air inlet ports 30a, 30b. The air discharged through the air outlets 22a, 22b is transported away through the air outlet ports 32a, 32b.

A separating layer 36 is arranged between the first air-distributing layer 14 and the second air-distributing layer 34 and has a higher rigidity than the air-distributing layers 14, 34. The separating layer 36 has corresponding air passages in the area of the air inlets 18a, 18b and air outlets 22a, 22b.

The surface temperature-controlling device 10 comprises a material layer 40 made of silicone, which supports the surface 38 to be temperature-controlled. The surface 38 to be temperature-controlled is coupled to the second air-distributing layer 34 in a heat-transferring manner. The surface 38 of the surface temperature-controlling device 10 is covered with a rest cover 102, with the rest cover 102 of the rest 100 comprising the resting surface 104.

An electric heating device 42 is integrated in the material layer 40, which is designed as a film heating system and via which the heating power of the surface temperature-controlling device 10 is increased even further.

Figure 6:
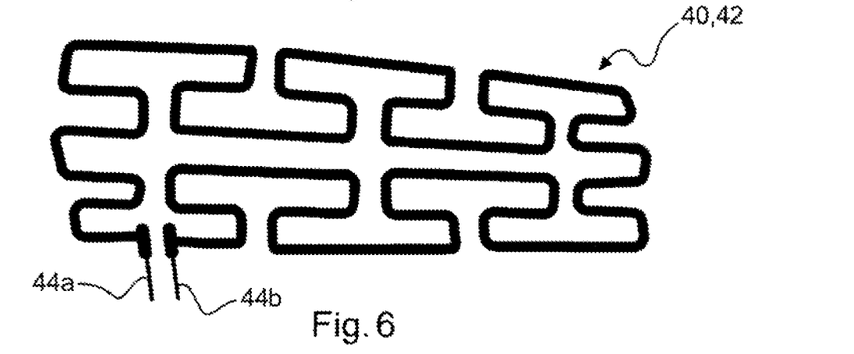
FIG. 6 shows a heating device of a surface temperature-controlling device according to the invention in a plan view.

FIG. 6 shows a corresponding electric heating device 42, which is designed as a film heating system. The heating device 42 has flat heating tracks which can be supplied with current via the connecting cables 44a, 44b. The heating tracks form a heating circuit. They are bent several times, and some have a meandering structure.

The heating device 42 is integrated in a transparent material layer 40.

Figure 7:
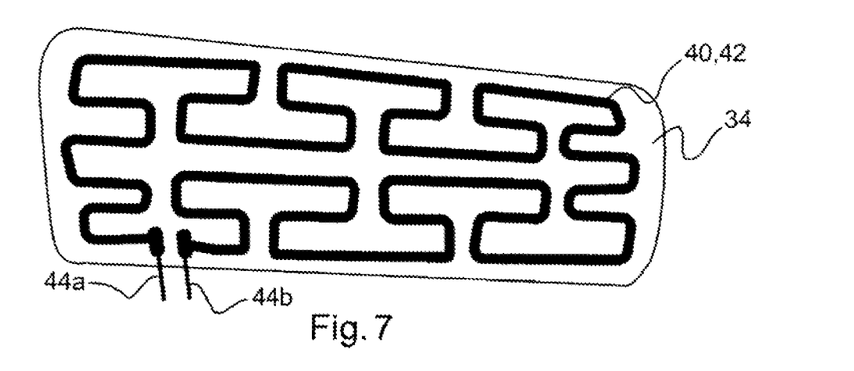
FIG. 7 shows the heating device shown in FIG. 6 with an air-distributing layer in a plan view.

FIG. 7 shows the transparent material layer 40 and the heating device 42 in combination with an air-distributing layer 34. In the course of the proportion of the surface temperature-controlling device 10, the air-distributing layer 34 is glued to the material layer 40, which comprises the heating device 42.

Figure 8:
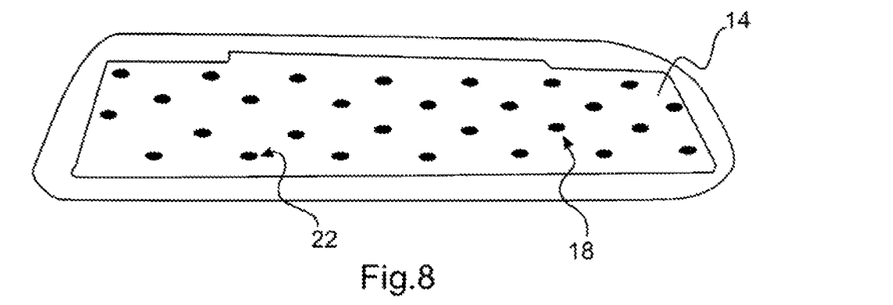
FIG. 8 shows the parts of the surface temperature-controlling device shown in FIG. 7 with a further air-distributing layer in a plan view.

FIG. 8 shows a further step in the manufacturing process of the surface temperature-controlling device 10. A further air-distributing layer 14 has now been applied to the air-distributing layer 34 and has a multiplicity of air inlets 18 and air outlets 22. The air-distributing layer 34 shown in FIG. 7 is air-permeable so that the air-distributing layer 34 fluidically connects the air inlets 18 and the air outlets 22 of the air-distributing layer 14.

Figure 9:
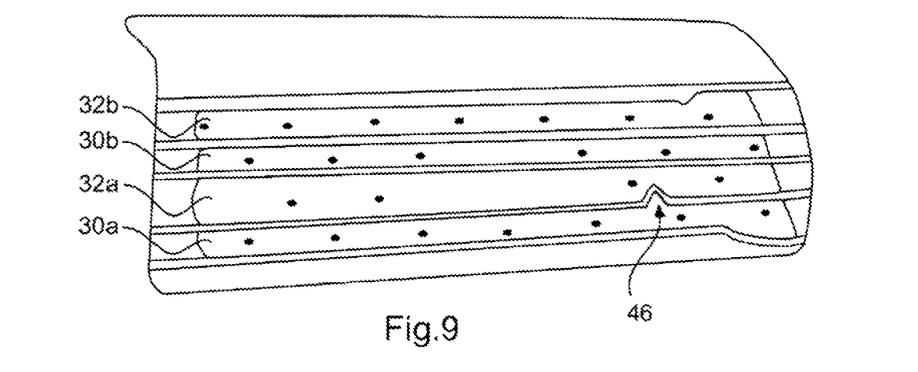
FIG. 9 shows the parts of the surface temperature-controlling device shown in FIG. 8 with air inlet ports and air outlet ports in a plan view.

FIG. 9 shows air inlet ports 30a, 30b and air outlet ports 32a, 32b, via which pre-heated or pre-cooled air can be made available to the air inlets 18, and air can be removed from the air outlets 22. A flow resistance 46 is shown by way of example, via which the air flow within the air inlet ports 30a, 30b or the air outlet ports 32a, 32b can be influenced.

Figure 10:
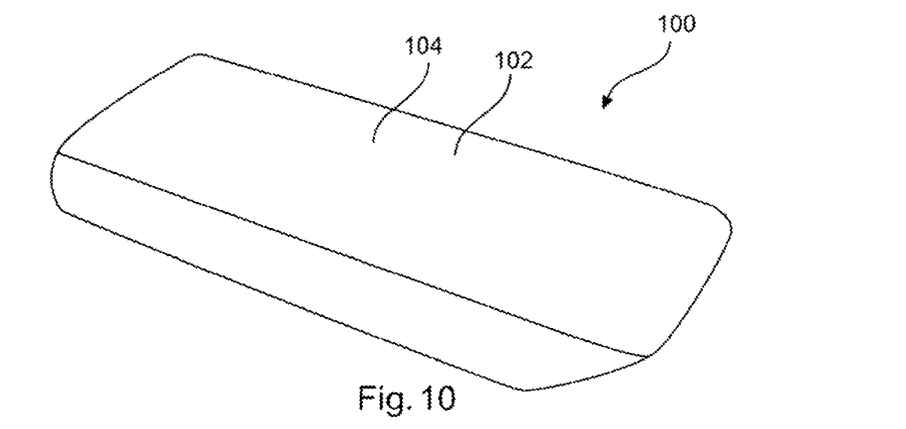
FIG. 10 shows a rest according to the invention, which comprises the parts of the surface temperature-controlling device shown in FIG. 9.

FIG. 10 shows a rest 100 which comprises a surface temperature-controlling device 10. The surface temperature-controlling device 10 of the rest 100 corresponds to the surface temperature-controlling device 10, the configuration of which was shown in FIG. 6-FIG. 9. The rest 100 accordingly comprises a rest cover 102 with a temperature-adjustable resting surface 104.

Figure 11:
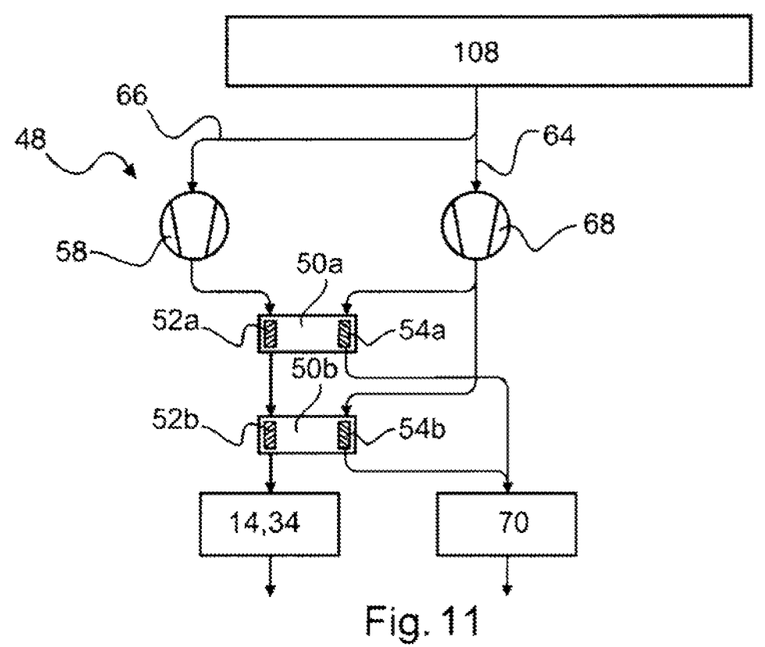
FIG. 11 shows a temperature control system of a surface temperature-controlling device according to the invention in a schematic representation.

FIG. 11 shows a temperature control system 48 of a surface temperature-controlling device 10 according to the invention. The temperature control system 48 is used for heating or cooling air before it is introduced into the air inlets 18 of the air-distributing layer 14.

The temperature control system 48 has a service air flow 66 and an exhaust air flow 64.

The service air flow 66 is generated by a flow generator 58, which draws in air from the environment 108. The flow generator 58 is designed as a fan. Furthermore, the temperature control system 48 has a plurality of thermoelectric devices 50*a*, 50*b*, each of which has a service side 52*a*, 52*b* and an exhaust air side 54*a*, 54*b*. With regard to the service air flow 66, the thermoelectric devices 50*a*, 50*b* are connected in series so that the air to be temperature-controlled first flows through the temperature-control area of the thermoelectric device 50*a* and then through the temperature-controlled area of the thermoelectric device 50*b* before the air temperature-controlled in this way is brought to the air-distributing layers 14, 34.

The exhaust air flow 64 is generated by the flow generator 68, which is also designed as a fan. The flow generator 68 draws in air from the environment 108. The exhaust air flow is divided upstream of the thermoelectric devices 50*a*, 50*b* so that the thermoelectric devices 50*a*, 50*b* are connected in parallel with respect to the exhaust air flow 64. The exhaust air flow 64 removes waste heat from the thermoelectric devices 50*a*, 50*b*. The exhaust air is finally brought to an exhaust air outlet 70.

Figure 12:
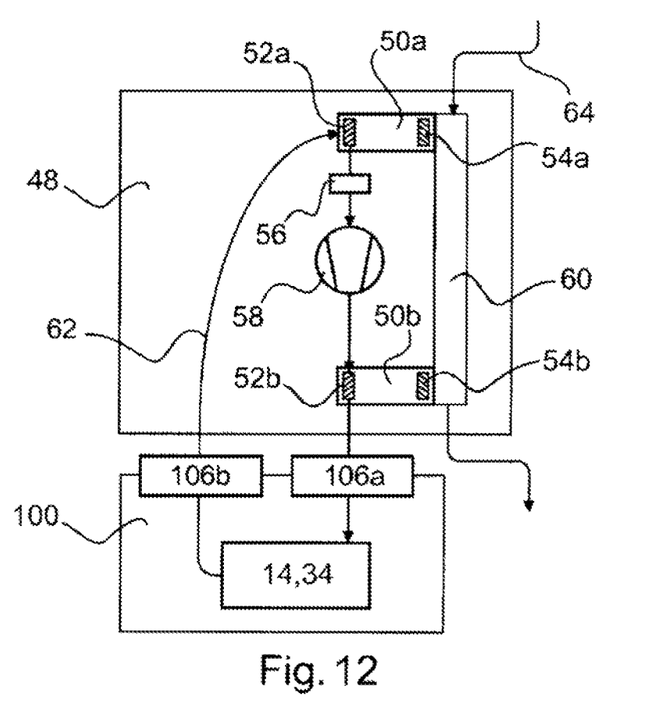
FIG. 12 shows an alternative temperature control system of a surface temperature-controlling device according to the invention in a schematic representation.

FIG. 12 shows an alternative temperature control system 48 in which the first air-distributing layer 14 and the second air-distributing layer 34 are integrated in a flow circuit 62. The air circulation within the flow circuit 62 is generated by the flow generator 58, which is designed as a fan. Arranged in front of the flow generator 58 is a condensation removal device 56 which extracts moisture from the circulating air with a non-woven fabric. Furthermore, the temperature control system 48 comprises two thermoelectric devices 50*a*, 50*b*, the service sides 52*a*, 52*b* of which are also integrated in the flow circuit 62. The exhaust air sides 54*a*, 54*b* are connected in a heat-transferring manner to a heat exchanger 60 through which a flow of liquid 64 is guided in order to remove waste heat.

Seals 106*a*, 106*b* are provided in the transition to the rest 100 so that an unintentional escape of air from the flow circuit 62 is prevented.

Figure 13:
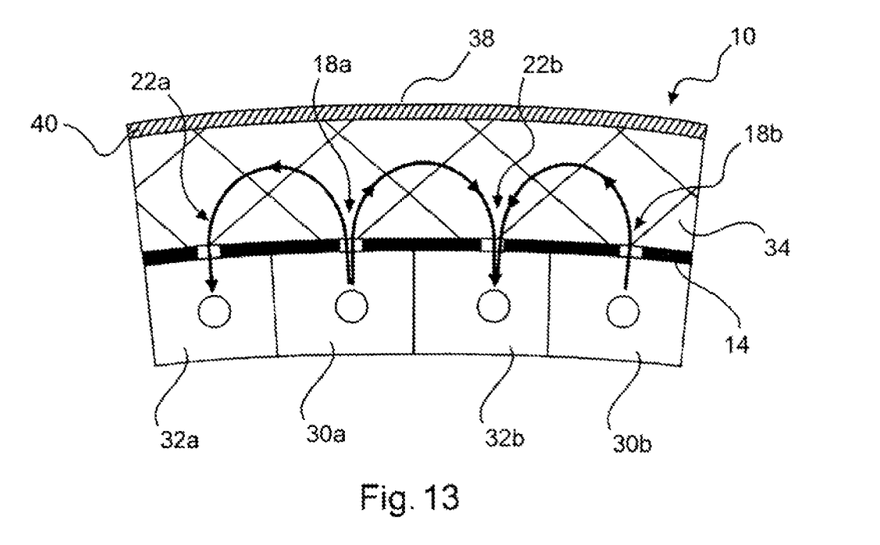
FIG. 13 shows an exemplary embodiment of a surface temperature-controlling device according to the invention in a schematic representation.

FIG. 13 shows a further exemplary embodiment of a surface temperature-controlling device 10, which likewise has a first air-distributing layer 14 and a second air-distributing layer 34. The second air-distributing layer 34 is designed as spacer fabric so that the second air-distributing layer 34 fluidically connects the air inlets 18*a*, 18*b* and the air outlets 22*a*, 22*b* of the first air-distributing layer 14 to one another.

The pre-heated or pre-cooled air is supplied to the air inlets 18*a*, 18*b* via the air inlet ports 30*a*, 30*b*. The air discharged through the air outlets 22*a*, 22*b* is discharged via the air outlet ports 32*a*, 32*b*.

Figure 14:
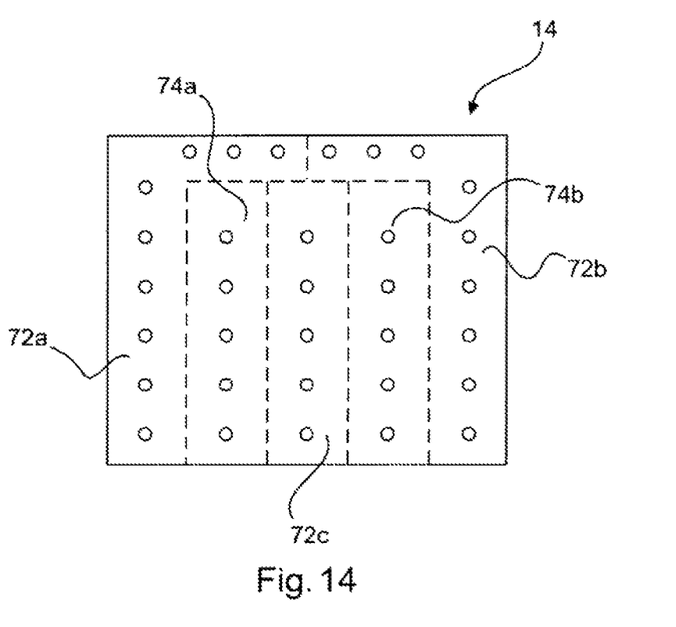
FIG. 14 shows an air-distributing layer of a surface temperature-controlling device according to the invention in a plan view.

FIG. 14 shows an air-distributing layer 14 with three groups 72*a*-72*c* of air inlets and two groups 74*a*, 74*b* of air outlets. The air inlets of the groups 72*a*, 72*b* are located outside and are arranged in an L-shape. The groups 74*a*, 74*b* each have a number of air outlets. Group 72*c* has a series of air inlets. The air inlets and air outlets of groups 74*a*, 74*b*, 72*c* run substantially parallel to one another.

REFERENCE SIGNS

10 Surface temperature-controlling device
12 Surface
14 First air-distributing layer
16, 16*a*-16*n* Air inlet openings
18, 18*a*, 18*b* Air inlets
20, 20*a*-20*n* Air outlet openings
22, 22*a*, 22*b* Air outlets
24 Air distribution body
26*a*, 26*b* Rows of air inlets
28*a*, 28*b* Rows of air outlets
30*a*, 30*b* Air inlet ports
32*a*, 32*b* Air outlet ports
34 Second air-distributing layer
36 Separating layer
38 Surface to be temperature controlled
40 Material layer
42 Heating device
44*a*, 44*b* Connection cable
46 Flow resistance
48 Temperature control system
50*a*, 50*b* Thermoelectric devices
52*a*, 52*b* Use sides
54*a*, 54*b* Exhaust air sides
56 Condensation removal device
58 Flow generator
60 Heat exchanger
62 Flow circuit
64 Exhaust air flow or liquid flow
66 Service air flow
68 Flow generator
70 Exhaust air outlet
72*a*-72*c* Groups of air inlets
74*a*, 74*b* Groups of air outlets
100 Rest
102 Rest cover
104 Rest surface
106*a*, 106*b* Seats
108 Environment

The invention claimed is:

1. A surface temperature-controlling device in an armrest, comprising:
   a first air-distributing layer located in the armrest and comprising:
      air outlets arranged in two or more rows along a longitudinal axis extending between opposing ends of the first air-distributing layer, and extending through a thickness of the first air-distributing layer in a direction transverse to the longitudinal axis; and
      air inlets arranged in one or more rows along the longitudinal axis and extending through the thickness of the first air-distributing layer in the direction transverse to the longitudinal axis, one of the one or more rows of air inlets being disposed between two of the two or more rows of air outlets, and the air inlets being staggered to the air outlets such that adjacent rows form a zig-zag pattern arranged along the longitudinal axis;
   a second air-distributing layer that fluidically connects the air inlets and the air outlets, and air flows that run transversely to the air inlets and/or the air outlets are created inside the second air-distributing layer; and
   a flow generator from which pre-heated or pre-cooled air is provided to the air inlets and to which the pre-heated or pre-cooled air is provided from the air outlets;
   wherein each of the air inlets supply the pre-heated or pre-cooled air to multiple of the air outlets between which the air inlets are arranged;
   wherein each of the air inlets provide the pre-heated or pre-cooled air to the multiple air outlets and the multiple air outlets are evenly spaced apart and evenly distributed around one of the air inlets from which the multiple air outlets are provided the pre-heated or pre-cooled air;

wherein each of the air outlets are provided the pre-heated or pre-cooled air from multiple of the air inlets and the multiple air inlets are evenly spaced apart and evenly distributed around one of the air outlets to which the multiple air inlets provide the pre-heated or pre-cooled air;

wherein the air inlets introduce the pre-heated or pre-cooled air into the second air-distributing layer and the air outlets discharge the pre-heated or pre-cooled air from the second air-distributing layer; and wherein the first air-distributing layer and the second air-distributing layer are integrated in a flow circuit, wherein the pre-heated or pre-cooled air circulates within the flow circuit so that the pre-heated or pre-cooled air is used repeatedly.

2. The surface temperature-controlling device according to claim 1, wherein the air inlets are connected to one another via first bypass lines within the first air-distributing layer and the air outlets are connected to one another via second bypass lines within the first air-distributing layer.

3. The surface temperature-controlling device according to claim 1, wherein exchange of the pre-heated or pre-cooled air between the air inlets and the air outlets only occurs in the second air-distributing layer.

4. The surface temperature-controlling device according to claim 1, wherein the air outlets are arranged in two or more rows along a transverse axis extending between opposing ends of the first air-distributing layer, and the air inlets are arranged in one or more rows along the transverse axis.

5. The surface temperature-controlling device according to claim 1, wherein the first air-distributing layer has a surface facing the second air-distributing layer, which comprises air inlet openings and air outlet openings.

6. The surface temperature-controlling device according to claim 4, wherein the air inlets are equally spaced along the longitudinal axis of the first air-distributing layer and the air outlets are equally spaced along the longitudinal axis of the first air-distributing layer.

7. The surface temperature-controlling device according to claim 6, wherein four of the air inlets provide the pre-heated or pre-cooled air to each of the air outlets and four of the air outlets are provided the pre-heated or pre-cooled air from each of the air inlets.

8. The surface temperature-controlling device according to claim 5, wherein a cross section of several or all of the air inlets and/or the air outlets and/or several or all of the air inlet openings and/or the air outlet openings have different sizes and/or different shapes.

9. The surface temperature-controlling device according to claim 8, wherein a number of the air inlets differs from a number of the air outlets.

10. The surface temperature-controlling device according to claim 9, wherein the first air-distributing layer and/or second air-distributing layer comprises flow constrictions that influence air flow and cause a change in pressure.

11. The surface temperature-controlling device according to claim 10, wherein one or more of the air inlets, the air outlets, the air inlet openings, and/or the air outlet openings are disposed outward from one or more of the air inlets, the air outlets, the air inlet openings, and/or the air outlet openings; and wherein the one or more air inlets, air outlets, air inlet openings, and/or air outlet openings that are outwardly disposed have a smaller distance from one another and/or have a different size, relative to the one or more air inlets, air outlets, air inlet openings, and/or air outlet openings that are inwardly disposed.

12. The surface temperature-controlling device according to claim 11, wherein several or all of the air inlets are fluidically connected to one another on a side of the first air-distributing layer facing away from the second air-distributing layer and/or several or all of the air outlets are fluidically connected to one another on the side of the first air-distributing layer facing away from the second air-distributing layer.

13. The surface temperature-controlling device according to claim 12, wherein an air-permeable material is arranged in or over the air inlet openings and/or the air outlet openings.

14. The surface temperature-controlling device according to claim 13, wherein the first air-distributing layer and/or the second air-distributing layer are formed from an air-permeable material or have an air-permeable material in some areas.

15. The surface temperature-controlling device according to claim 13, wherein the first air-distributing layer is formed from a hard shell material, the hard shell material defining the air inlets and the air outlets.

16. The surface temperature-controlling device according to claim 13, wherein a separating layer is arranged between the first air-distributing layer and the second air-distributing layer, the separating layer having a higher rigidity than the first air-distributing layer and/or the second air-distributing layer.

17. The surface temperature-controlling device according to claim 16, wherein an electric heating device is arranged between the second air-distributing layer and a material layer supporting a surface to be temperature-controlled, or the electric heating device is integrated into the material layer supporting the surface to be temperature-controlled.

18. The surface temperature-controlling device according to claim 1, further comprising a first thermoelectric device and a second thermoelectric device downstream of the flow generator and upstream of the first air-distributing layer.

19. The surface temperature-controlling device according to claim 1, further comprising a first thermoelectric device disposed downstream of the flow generator and upstream of the first air-distributing layer; and a second thermoelectric device disposed downstream of the second air-distributing layer and upstream of the flow generator; and wherein the first and second thermoelectric devices pre-heat or pre-cool the pre-heated or pre-cooled air.

20. The surface temperature-controlling device according to claim 19, further comprising a condensation removal device that removes condensation from the pre-heated or pre-cooled air circulating in the flow circuit; wherein the condensation removal device is located downstream of the second thermoelectric device and upstream of the flow generator.

* * * * *